US008509446B2

(12) United States Patent
Fujiwara et al.

(10) Patent No.: US 8,509,446 B2
(45) Date of Patent: Aug. 13, 2013

(54) TIME-BIN POLARIZATION FORMAT EXCHANGE TECHNIQUE FOR ENTANGLED OPTICAL SOURCE

(75) Inventors: Mikio Fujiwara, Tokyo (JP); Morio Toyoshima, Tokyo (JP); Masahide Sasaki, Tokyo (JP); Akihisa Tomita, Tokyo (JP); Yoshihiro Nambu, Tokyo (JP); Ken-ichiro Yoshino, Tokyo (JP)

(73) Assignees: National Institute of Information and Communications Technology, Tokyo (JP); NEC Corporation, Tokyo (JP)

( * ) Notice: Subject to any disclaimer, the term of this patent is extended or adjusted under 35 U.S.C. 154(b) by 123 days.

(21) Appl. No.: 12/979,707

(22) Filed: Dec. 28, 2010

(65) Prior Publication Data
US 2011/0170695 A1 Jul. 14, 2011

(30) Foreign Application Priority Data
Jan. 14, 2010 (JP) .................. 2010-005517

(51) Int. Cl.
*H04L 9/08* (2006.01)
(52) U.S. Cl.
USPC .................. 380/278; 380/28; 380/41; 380/44

(58) Field of Classification Search
USPC .................... 380/28, 41, 44, 278–9
See application file for complete search history.

(56) References Cited

U.S. PATENT DOCUMENTS

| 5,930,414 | A * | 7/1999 | Fishman et al. | 385/11 |
|---|---|---|---|---|
| 7,346,166 | B2 * | 3/2008 | Inoue et al. | 380/263 |
| 7,536,012 | B1 * | 5/2009 | Meyers et al. | 380/44 |
| 7,555,127 | B2 * | 6/2009 | Nambu et al. | 380/256 |
| 2006/0290941 | A1 * | 12/2006 | Kesler et al. | 356/491 |
| 2011/0170695 | A1 * | 7/2011 | Fujiwara et al. | 380/278 |

FOREIGN PATENT DOCUMENTS
JP 2008-205993 A 9/2008
* cited by examiner

*Primary Examiner* — Amare F Tabor
(74) *Attorney, Agent, or Firm* — Posz Law Group, PLC

(57) ABSTRACT

It is an object of the present invention to provide a network system for quantum key distribution (QKD) for free space and fiber networks. The system of the present invention generates a couple of photons which have different wavelength and inputs each of the photons into the asymmetric Mach-Zehnder interferometer to obtain time-bin entangled state. It provides polarization information with one part of the photons. Then it can obtain hybrid quantum entanglement. The system of the present invention may be used hybrid quantum key distribution system applied for both free space and fibers.

4 Claims, 6 Drawing Sheets

TIME-BIN POLARIZATION FORMAT EXCHANGE TECHNIQUE FOR ENTANGLED OPTICAL SOURCE

TECHNICAL FIELD

The present invention relates to time-bin polarization format exchange technique for entangled optical source that can realize a network of quantum key distribution among free space and fibers.

BACKGROUND OF ART

Japanese Patent Publication 2008-205993 A1 (patent document 1) discloses a quantum cryptographic apparatus comprises an asymmetric Mach-Zehnder interferometer, AMZI. The quantum cryptographic apparatus is explained that it can attain maximum entangled state in polarized time-bin mode (See FIG. 4 and paragraph [0049]).

DISCLOSURE OF PRIOR ART

Patent Document

Patent document 1: Japanese Patent Publication 2008-205993 A1

DISCLOSURE OF INVENTION

Problem Solved by the Invention

The quantum cryptographic apparatus disclosed in Japanese Patent Publication 2008-205993 A1 (patent document 1) mainly transmits information on the freedom of time-bin pulse through transmit route like fibers. On the other hand, there is a project regarding a quantum key distribution (QKD) system that can transmit information through free space. In such a space transmission system, it is proposed that the freedom of polarization of photon may contain information and the photon may transmit through the free space.

Even though the quantum cryptographic apparatus disclosed in Japanese Patent Publication 2008-205993 A1 (patent document 1) can realize QKD through fibers, it cannot be used for QKD in free space.

One object of the present invention is to provide a hybrid quantum key distribution network system that can be applied for both free space and fibers as transmission routs.

Means for Solving Problem

The present invention basically based on the following view. It generates a couple of photons which have different wavelength. It inputs each of the photons into the asymmetric Mach-Zehnder interferometer to obtain time-bin entangled state. It provides polarization information with one part of the photons. Then it can obtain hybrid quantum entanglement. The system of the present invention may be used by a hybrid quantum key distribution system applied for both free space and fibers.

Technical Effect

The present invention is capable of providing a hybrid quantum key distribution network system that can use both free space and fibers as transmission routs.

EXPLANATION OF DRAWINGS

FIG. 8 depicts a schematic diagram of a format transformer.

BEST MODE FOR CARRYING OUT THE INVENTION

Figure 1:
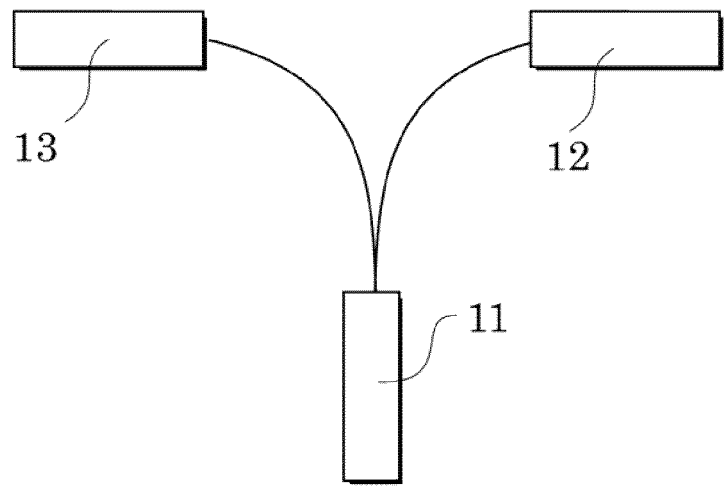
FIG. 1 is a block diagram of the quantum key distribution system.

The first aspect of the invention relates to a quantum key distribution system. FIG. 1 is a block diagram of the quantum key distribution system. As shown in FIG. 1, the quantum key distribution system comprises a photon generator 11 for generating a first photon (e.g., 1550 nm) and a second photon (e.g., 810 nm); an asymmetric Mach-Zehnder interferometer 12 (e.g, AMZI on PLC) into which the first photon generated by the photon generator 11 enters; and a polarization and time delay adder 13 that gives polarization and time delay to the second photon generated by the photon generator 11.

A quantum key distribution (QKD) system is already known in the technical field of information and communication technology, such as quantum cryptographic communication technology. The system of the present invention may equip already known features in QKD systems.

A photon generator 11 is a device that generates the first photon and the second photon.

The first photon may be in near ultraviolet or visible region which is suitable for fiber communication. The example of wavelength of the photon is 1550 nm. Preferred wavelength of the first photon is from 800 nm to 2000 nm. The first photon is transmitted to Bob.

The second photon may be in near visible region which is suitable for free space communication. The example of wavelength of the photon is 810 nm. Preferred wavelength of the second photon is from 500 nm to 1200 nm. The second photon is transmitted to Alice.

Figure 2:
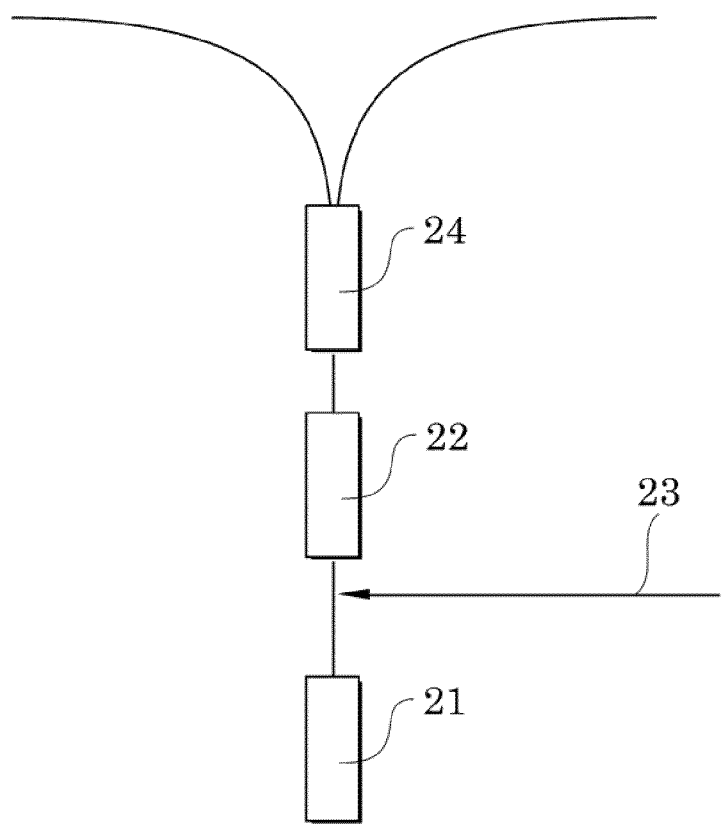
FIG. 2 is a block diagram of the photon generator.

FIG. 2 is a block diagram of the photon generator. The example of the photon generator 11 comprises a light source 21 that generates continuous wave light in near ultraviolet or visible region, and a non liner optical crystal 22 for obtaining photon in from visible to infrared region by down conversion of the continuous wave generated by the light source 21.

The example of the light source 21 is a CW light source that comprises YAG laser. The example of wavelength of CW light in near ultraviolet or visible region output by the light source 21 is 532 nm. The example of wavelength of CW light in ultraviolet or visible region is from 100 nm to 600 nm. The example of power of the CW light is from 10 micro W to 1 mW. The light source 21 may be a pulse light source. When a pulse light source is used as a light source 21, it is preferred to set its Coherence length to be longer than delay time of the asymmetric Mach-Zehnder interferometer 12.

A non liner optical crystal 22 is already known as one of optical elements. Thus it is possible to manufacture non liner optical crystals used in the present invention based on already known techniques.

The light from the light source 21 and pump light 23 enter the non liner optical crystal and then the first photon and the second photon will emerge. The pump light may be CW light or pulse light. When pulse light is used, it is preferred to set the Coherence length of the pulse light source to be longer than delay time of the asymmetric Mach-Zehnder interferometer 12. After separating these photons by means of the separator 24, the photons are directed to Alice side or Bob side. The example of the separator 24 is a dichroic minor. The separator 24 may consist of a beam splitter and an optical filter.

Figure 3:
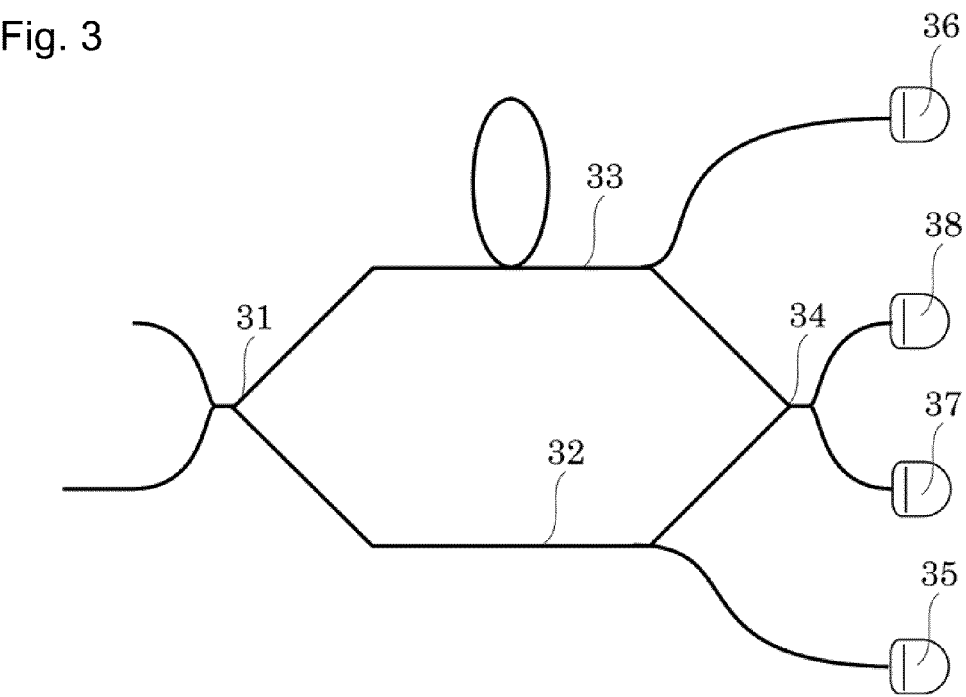
FIG. 3 shows an example of asymmetric Mach-Zehnder interferometer which may be used Bob.

FIG. 3 shows an example of asymmetric Mach-Zehnder interferometer which may be used by Bob. As shown in FIG. 3, the asymmetric Mach-Zehnder interferometer 12 comprises two inputs and four outputs. The asymmetric Mach-Zehnder interferometer 12, AMZI, comprises a branching part 31; the first arm 32 which is connected to the branching part 31; the second arm 33 which is connected to the branching part 31; a combining part 34 which is connected to both of the first arm 32 and the second arm 33. The first arm 32 and the second arm 33 may comprise one or plurality of electrodes, which are not depict in figures, such that the electrodes can control the optical phase of propagating light. It is preferred for the asymmetric Mach-Zehnder interferometer 12 to be put on planner light circuit, PLC.

The optical length of the first arm 32 and that of the second arm 33 are different. It gives time delay for arriving the combining part 34 to the light that propagate on the second arm 33 compared to the light that propagate on the first arm 32. The asymmetric Mach-Zehnder interferometer 12 can give time delay to photon and can obtain photon pair. The difference of the optical length of the first arm 32 and that of the second arm 33 is known. Thus the first arm 32 and that of the second arm 33 may be designed based on already known difference of optical length.

Figure 4:
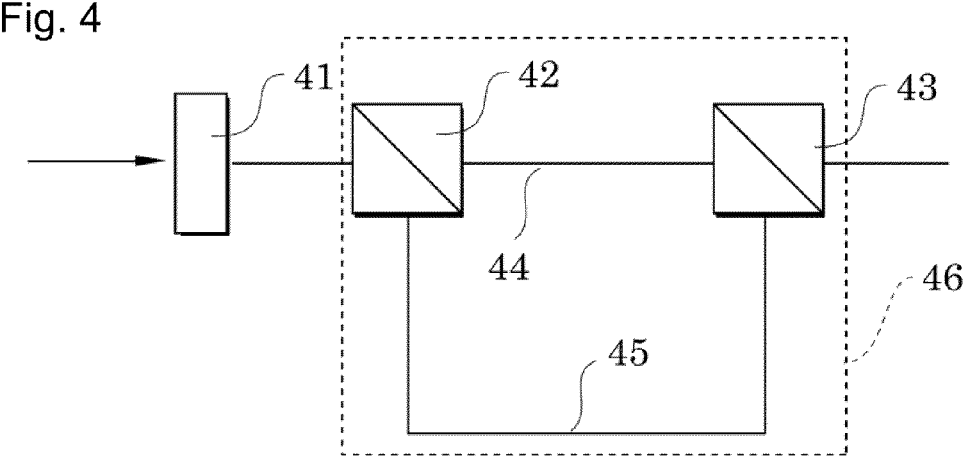
FIG. 4 is a block diagram for explaining a polarization and time delay adder.

The asymmetric Mach-Zehnder interferometer 12 depicted in FIG. 3 comprises four optical detectors 35-38. Namely, the asymmetric Mach-Zehnder interferometer 12 comprises the first optical detector that is connected to the first arm 32, the second optical detector 36 that is connected to the second arm 33, the third optical detector 37 and the fourth optical detector 38 that are connected to the combining part 34. FIG. 4 is a block diagram for explaining a polarization and time delay adder. The polarization and time delay adder 13 is a device that gives polarization and time delay to the second photon. The polarization and time delay adder 13 depicted in FIG. 4 comprises a polarization controller 41, the first beam splitter 42, and the second beam splitter 43.

The first beam splitter 42 and the second beam splitter 43 are optically connected through the first pass 44 and the second pass 45. The optical length of the first pass 44 and the second pass 45 are different. Namely, the part comprising the first beam splitter 42 and the second beam splitter 43 composes an asymmetric Mach-Zehnder interferometer 46. The optical length of the first pass 44 may be adjusted by adjusting the distance between the first beam splitter 42 and the second beam splitter 43. The optical length of the second pass 45 may be adjusted by controlling the position of the mirror which is not depicted in figure. As explained the above, the optical length of the first pass 44 and that of the second pass 45 may be adjusted.

The second photon enters the polarization controller 41. Then, the plane of polarization of the second photon is adjusted by the polarization controller 41. The photon output from the polarization controller 41 enters the first beam splitter 42 and separated based on its plane of polarization. One part of the separated photon separated by the first beam splitter 42 enters the second beam splitter 43 through the first pass 44. The other part of separated photon separated by the first beam splitter 42 enters the second beam splitter 43 through the second pass 45. The second pass has longer optical length than the first pass. It can bring the time delay to the photon that passes through the second pass 45. Thus the system can generate photon pair that comprises the photon that passes through the first pass 44 and the photon that passes through the second pass 45 at the second beam splitter 43. By doing the above the system may add polarization mode onto time-bin mode. Namely the polarization and time delay adder 13 may act as an optical source for hybrid quantum entanglement because it can overload information of polarization onto photon pair in time-bin mode.

The photon pair that passes the polarization and time delay adder reaches Alice through free space. Apparatus of Alice side may be composed only by a polarizer and photon detector.

It is preferred that the time delay given by the asymmetric Mach-Zehnder interferometer 12 and that given by the polarization and time delay adder 13 are the same value. The example of the time delay is from 10 pico second to 100 nano second.

EXAMPLE 1

Figure 5:
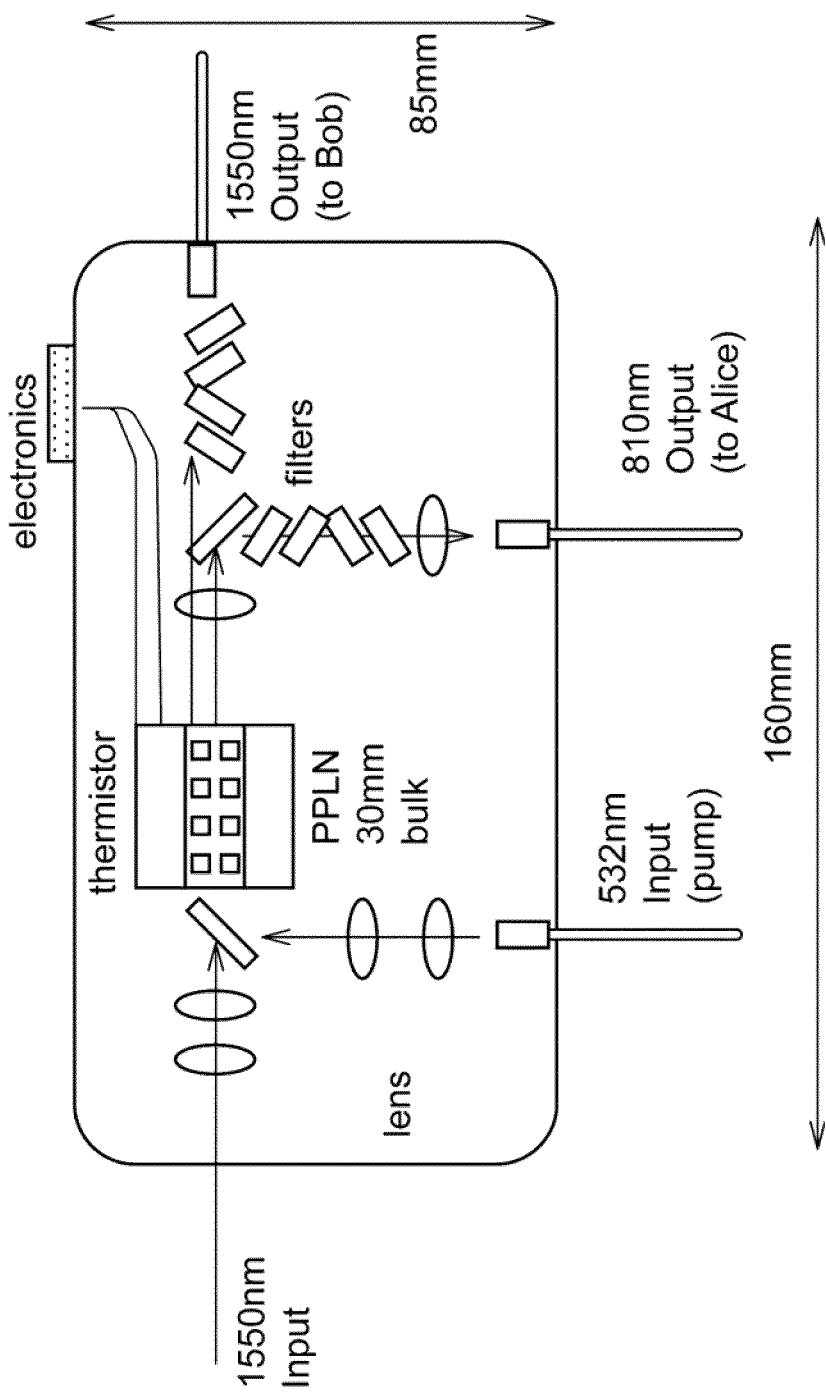
FIG. 5 is a block diagram a hybrid quantum key distribution network system that can connect free space and fiber networks.

FIG. 5 is a block diagram a hybrid quantum key distribution network system that can connect free space and fiber networks.

Figure 6:
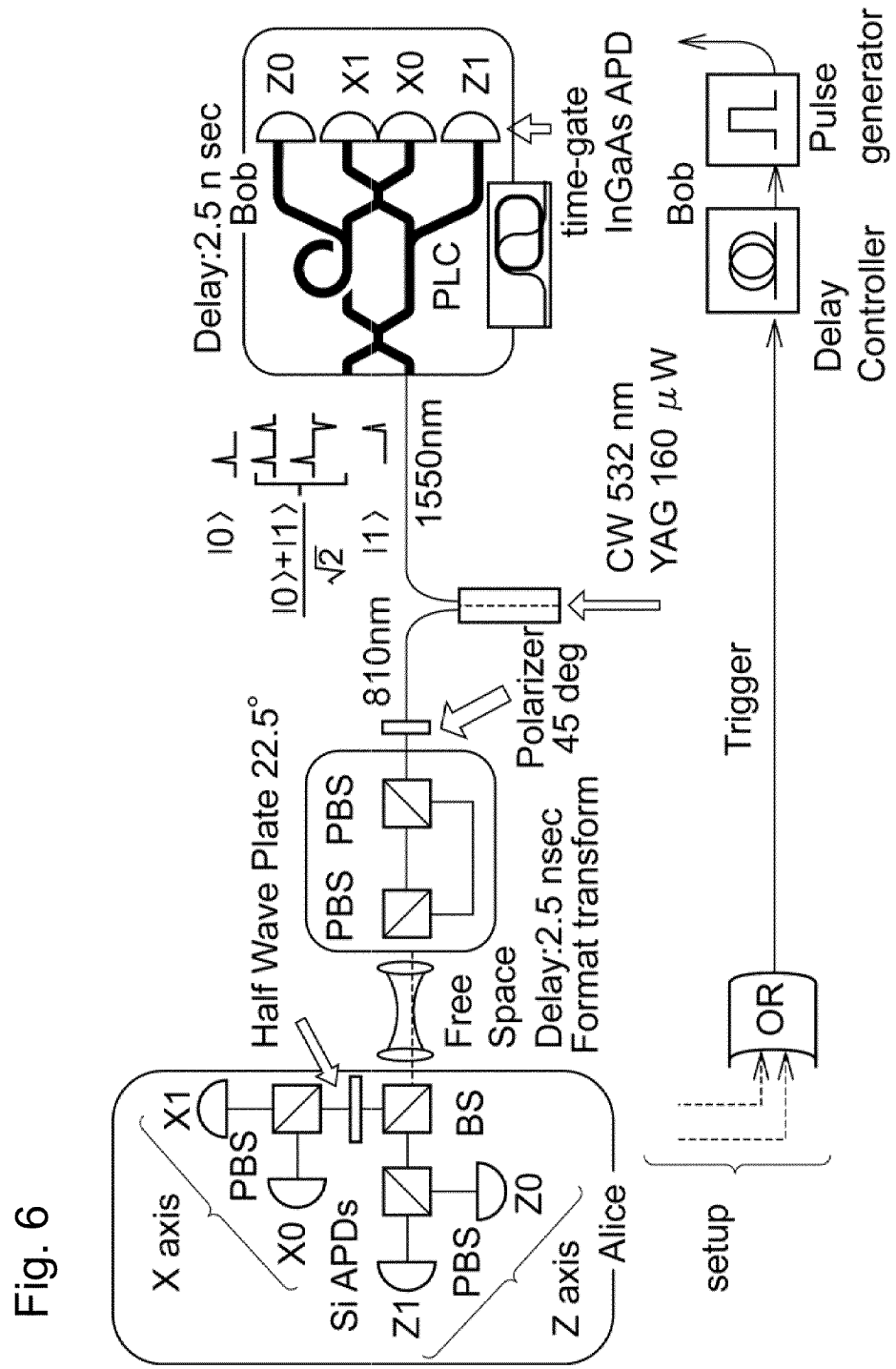
FIG. 6 is a block diagram of a hybrid entanglement photon pair generator.

FIG. 6 is a block diagram of a hybrid entanglement photon pair generator. The second harmonic generated light of YAG laser was uses as a light souse.

A 532 nm continuous wave CW laser adjusted at 160 micro W is incident on a 30 mm long periodically poled lithium niobate PPLN crystal that is quasiphase-matched to create copolarized entangled photons at 810 and 1550 nm. For this PPLN, the mode diameters of the 532 nm pump beam, 810 and 1550 nm photons are optimized to be 84, 84, and 108 micro meters, respectively, to couple with single mode fibers. Photons that have wavelength of 810 nm and 1550 nm were obtained by executing down conversion of 532 nm light by means of the apparatus shown in FIG. 6.

The 810 and the 1550 nm photons are separated using a dichroic mirror. Long-wavelength pass filters were used to reduce stray photons. After down conversion, a 1550 nm photon is incident a decoder set at Bob side. The decoder comprises a two-input and four-output silica-based PLC on a silicon substrate, featured by an asymmetric Mach-Zehnder interferometer, AMZI, with a 2.5 ns time delay. 50 cm long spiral pattern was fabricated to make the 2.5 ns time delay.

Figure 7:
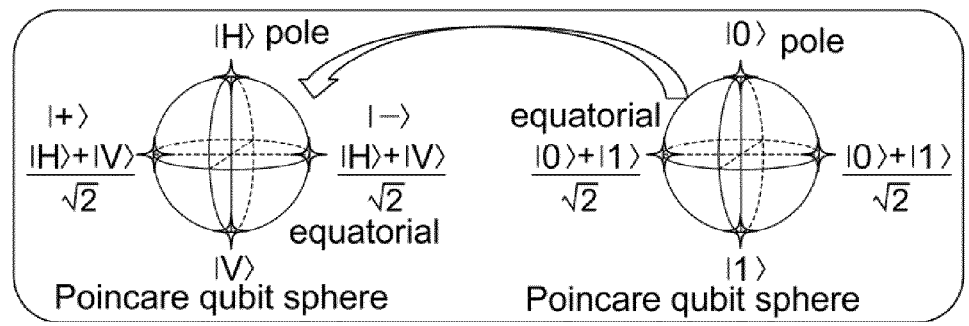
FIG. 7 shows a schematic view of the Poincare sphere.

The output photons of the decoder are projected onto vectors |0>, |0>−|1>, |0>+|1>, and |1> of the Poincare sphere. FIG. 7 shows a schematic view of the Poincare sphere. The vector |1> represents a photon in the first time-bin having passed through the short arm, and |0> represents a photon in the second time-bin having passed through the long arm. |0> and |1> are mapped on the polar state (z axis), and |0>−|1> and |0>+|1> are on the equatorial state (x axis). 1550 nm photons are detected by In GaAs based avalanche photo-diodes, APDs, with 10% detection efficiencies in the gated Geiger mode.

The triggers for detection are given by Si based APDs, Perkin Elmer single photon counting modules: SPCMs, through a delay generator from Alice. The detection efficiency of the SPCM for 810 nm photons was about 55%.

Hybridization of polarization information on the time-bin entanglement is described below.

Figure 8A:
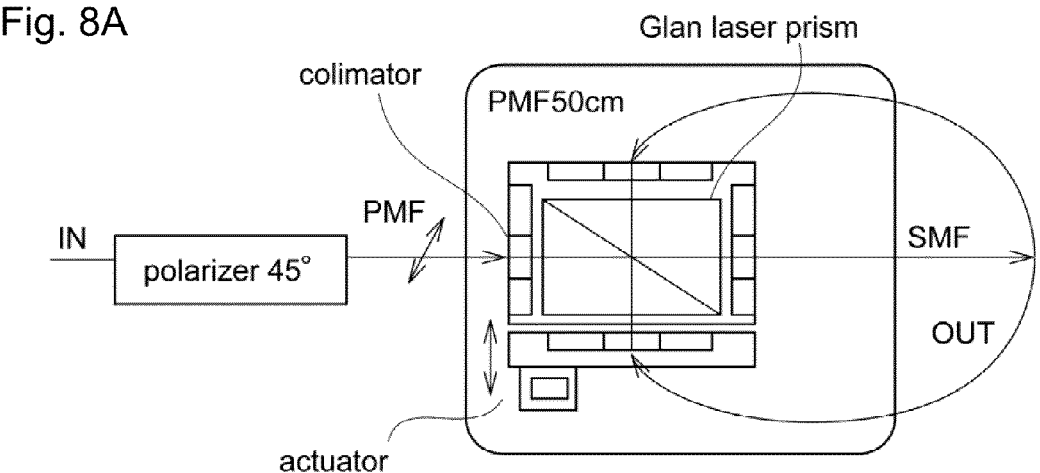
FIG. 8A shows a format transformer that comprises a Glan laser prism.
Figure 8B:
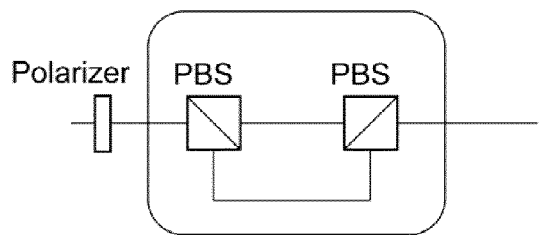
FIG. 8B shows a format transformer that comprises a polarizer and two polarizing beam splitters.

The 810 nm photon sent to Alice is input a format-transformer, a polarization and time delay adder. FIG. 8 depict a schematic diagram of a format transformer. FIG. 8A shows a format transformer that comprises a Glan laser prism. FIG. 8B shows a format transformer that comprises a polarizer and two polarizing beam splitters. The format transformer of FIG. 8A and that of FIG. 8B are optically equivalent circuit. The format transformer of FIG. 8B comprises an asymmetric Mach-Zehnder interferometer.

The format transformer of FIG. 8A comprises a Glan laser prism that has polarizing branch ration of 50 dB, a polarization-maintaining fiber, PMF, and a polarizer. The delay time may be adjusted by means of a micrometer that is connected with the input of the entrance terminal of the delay fiber. The additional loss of the format transformer is 1.5 dB. The format-transformer alters the entanglement state $$|\phi\rangle = \frac{1}{\sqrt{2}} \{|0\rangle_A |0\rangle_B + \exp[i\theta(-\tau) - i\theta(0)]|1\rangle_A |1\rangle_B\}$$

to the one described by $$|\phi\rangle = \frac{1}{\sqrt{2}} \{|H\rangle_A |0\rangle_B + \exp[i\theta(-\tau) - i\theta(0)]|V\rangle_A |1\rangle_B\}$$

where |H> and |V> represent horizontal and vertical polarization states, respectively. The indices A and B stand for Alice and Bob. Theta (t:tau) indicates a relative phase difference. The relative phase theta (t) is defined with respect to a reference path length difference t(tau) between the short and the long arms.

After format conversion, the light passes though free space may be detected by Alice. The optical receiving device comprises beam splitters, BSs, Polarized beam splitters, PBSs, and a half wave plate. The polar states, z axis, |0> or |1>, can be easily distinguished by using a PBS because they are transformed to |H> or |V>. On the other hand, the equatorial states, x axis, |0>−|1> and |0>+|1> are analyzed after through a half wave plate set at 22.5°.

The entanglement state given coupled by the photon pair at t=0, at generated time, and the photon pair at t=tau are expressed by following equation.

$$|\phi\rangle = \frac{1}{2}(|-\rangle_A\{|0\rangle_B - \exp[i\theta(-\tau) - i\theta(0)]|1\rangle_B\} +$$
$$|+\rangle_A\{|0\rangle_B + \exp[i\theta(-\tau) - i\theta(0)]|1\rangle_B\}) =$$
$$\frac{1}{2}[|-\rangle_A(|0\rangle_B - |1\rangle_B) + |+\rangle_A(|0\rangle_B + |1\rangle_B)]$$

where $|-\rangle_A = \frac{1}{\sqrt{2}}(|H\rangle_A - |V\rangle_A)$, and $|+\rangle_A = \frac{1}{\sqrt{2}}(|H\rangle_A + |V\rangle_A)$.

The above equation describes the entanglement in the equatorial state, x axis, and it can also be analyzed by using a PBS and an SPCM.

To demonstrate the presence of this entanglement, we measured the coincidence events of the detection of the 810 and 1550 nm photons in the appropriate time window (40 nano second). The triggers for the gate pulses were given by OR of the detection outputs of the SPCMs at Alice, and fed to Bob's APDs through a delay generator.

Entanglement of pulse position at Bob side (1550 nm) corresponds to the entanglement of H and V at the base of photon that passes through the first BS and goes to PBS at Alice side (810 nm). Entanglement between phase differences of pulses may be measured at the base of photon that passes the first BS and was turned its plane of polarization by the half wave plate and goes to PBS. The optical system of Alice has simple structure it does not require any interferometer and composed of BS, PBS and half wave plates.

Figure 9A:
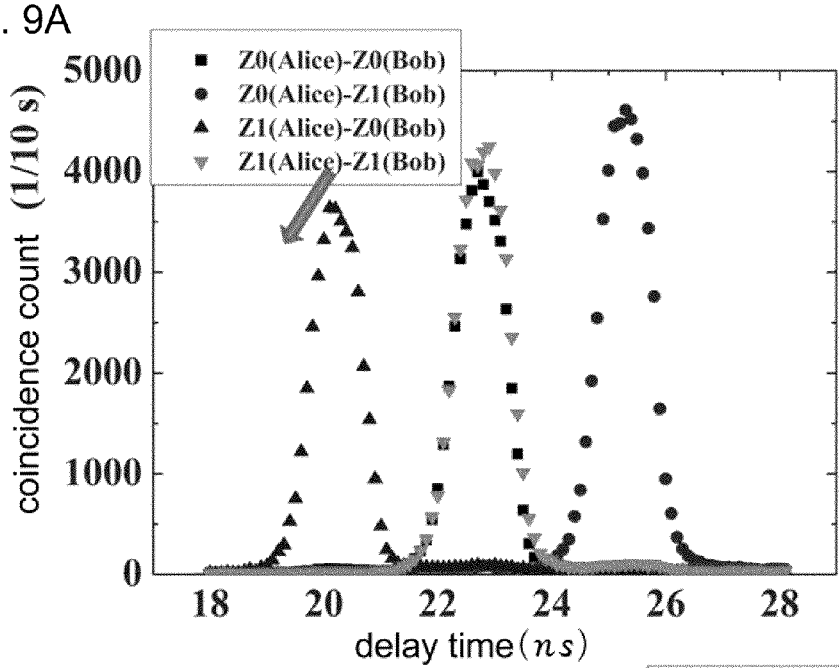
FIG. 9A is a graph that shows the coincidence counts of the polar state, z axis, as a function of delay time.

FIG. 9A is a graph that shows the coincidence counts of the polar state, z axis, as a function of delay time. FIG. 9A depicts dependency of trigger-delay time of 1550 nm PLC for the coincidence counts of detection of the 810 and 1550 nm photons when using entangle photon pair generator module at z base and x base and a format transformer. In the figure, one dot indicates counted number for 10 seconds. The count rate was 820 counts/second for z base and 950 counts/second for x base. Si APD was used as an optical detector for 810 nm photon and InGaAs APD was used as an optical detector for 1550 nm photon. The measurement was executed by each of bases and using the apparatus as depicted in FIG. 5 except for lacking BS at Alice side. Detector Z0 (Z1) indicates a detector that detects 0 (1) signal of the z axis. It is necessary to measure the coincidence of Z0 (Alice)–Z0 (Bob) and Z1 (Alice)–Z1 (Bob) after the same time delay.

Figure 9B:
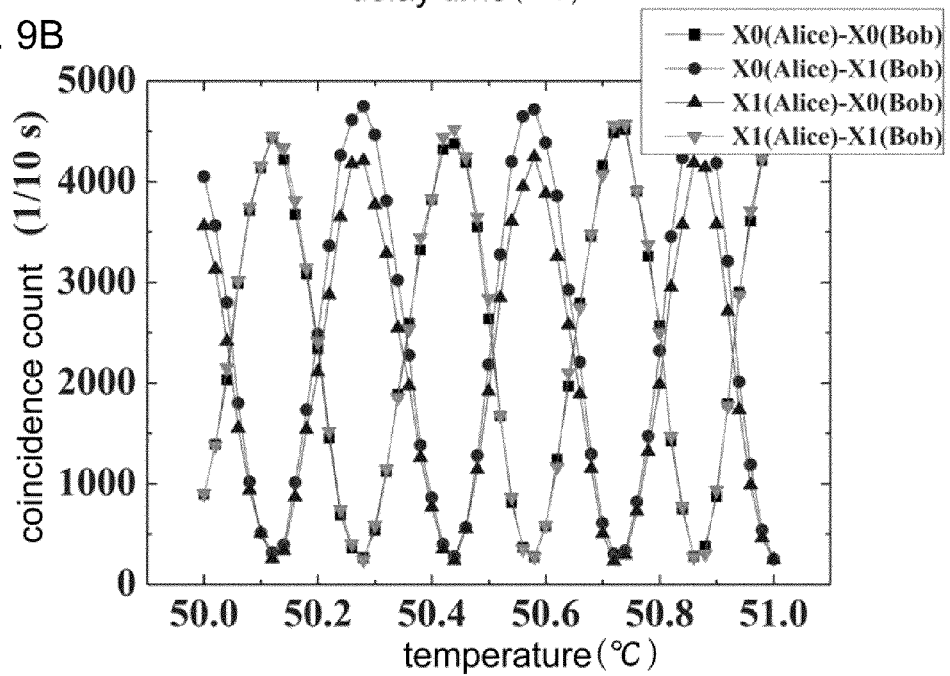
FIG. 9B is a graph that shows the coincidence counts of the equatorial state, x axis, as a function of delay time.

FIG. 9B is a graph that shows temperature dependency of the coincidence counts of quantum key distribution for the temperature of interferometer. FIG. 9B depicts dependency of temperature of 1550 nm PLC for the coincidence counts of detection of the 810 and 1550 nm photons when using entangled photon pair generator module at z base and x base and a format transformer. FIGS. 9A and 9B show that the system ban obtain more than 98% of visibilities for z base and more than 88% of visibilities for x base. Note that the ground of the defection of visibility in x base is thought to be defection of interference because of large delay time at the format transformer.

INDUSTRIAL APPLICABILITY

Explanation of Element numeral 11 photon generator
12 asymmetric Mach-Zehnder interferometer
13 a polarization and time delay adder
21 a CW light source
22 a non liner optical crystal
31 a branching part
32 a first arm
33 a second arm
34 a combining part
41 a polarization controller
42 a first beam splitter (PBS)
43 a second beam splitter (PBS)
44 a first pass
45 a first time delay adder (second pass)

The invention claimed is:
1. A quantum key distribution system comprising:
a photon generator for generating a first photon and a second photon which has shorter wavelength than the wavelength of the first photon;

an asymmetric Mach-Zehnder interferometer into which the first photon generated by the photon generator enters; and a polarization and time delay adder that gives polarization and time delay to the second photon generated by the photon generator;

wherein the polarization and time delay adder comprises:

a polarization controller into which the second photon enters;

a first beam splitter which separate photon from the polarization controller based on its plane of polarization;

a second beam splitter into which one part of photon separated by the first beam splitter and remaining photon separated by the first beam splitter enter; and a first time delay adder that can provide time delay with the remaining photon separated by the first beam splitter compared to the one part of photon separated by the first beam splitter.

2. The quantum key distribution system in accordance with claim 1, wherein the photon generator comprises:

a light source that generates continuous wave light in near ultraviolet or visible region; and a non liner optical crystal for obtaining photon in from visible to infrared region by down conversion of the continuous wave generated by the light source.

3. The quantum key distribution system in accordance with claim 1, wherein the asymmetric Mach-Zehnder interferometer comprises:

a branching part into which the first photon enters and at which the first photon branches;

a first arm, which is connected with the branching part, onto which photon branched at the branching part propagates; and a second arm, which is connected with the branching part, onto which other photon branched at the branching part propagates;

the optical length of the second arm being configured to be different from that of the first arm such that the second arm can output photon with time delay compared to the photon output from the first arm.

4. The quantum key distribution system in accordance with claim 1, wherein the time delay given by the asymmetric Mach-Zehnder interferometer and the time delay given by the polarization and time delay adder are the same.

* * * * *